(12) United States Patent
Surnilla et al.

(10) Patent No.: US 11,644,420 B2
(45) Date of Patent: May 9, 2023

(54) OCCUPANT LIGHT EXPOSURE DETECTION (71) Applicant: Ford Global Technologies, LLC, Dearborn, MI (US)

(72) Inventors: Avrokin Surnilla, West Bloomfield, MI (US); David Michael Herman, Oak Park, MI (US); John Craig Elson, Farmington Hills, MI (US); Scott Andrew Amman, Milford, MI (US); Nikhitha Bekkanti, Farmington Hills, MI (US); Michael Monforton, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 462 days.

(21) Appl. No.: 17/077,273

(22) Filed: Oct. 22, 2020

(65) Prior Publication Data
US 2022/0128466 A1 Apr. 28, 2022

(51) Int. Cl.
| | |
|---|---|
| *G01N 21/55* | (2014.01) |
| *B60R 11/04* | (2006.01) |
| *B60R 16/037* | (2006.01) |
| *B60R 11/00* | (2006.01) |
| *G06N 20/00* | (2019.01) |

(52) U.S. Cl.
CPC .............. *G01N 21/55* (2013.01); *B60R 11/04* (2013.01); *B60R 16/037* (2013.01); *G06N 20/00* (2019.01); *B60R 2011/0003* (2013.01); *G01N 2201/063* (2013.01)

(58) Field of Classification Search
CPC .............. G01N 21/55; G01N 2201/063; B60R 11/04; B60R 16/037; B60R 2011/0003
See application file for complete search history.

(56) References Cited

U.S. PATENT DOCUMENTS

2019/0152303 A1    5/2019  Ghannam et al.

FOREIGN PATENT DOCUMENTS

| CA | 2971493 A1    | 12/2018 |
| JP | 2006219008 A  | 8/2006  |
| KR | 101745261 B1  | 6/2017  |
| KR | 101761790 B1  | 8/2017  |

OTHER PUBLICATIONS

Katsushi Ikeuchi, "Determining Reflectance Properties of an Object Using Range and Brightness Images" IEEE Transactions on Pattern Analysis and Machine Intelligence, vol. 13, No. 11, Nov. 1991 (Year: 1991).*

(Continued)

*Primary Examiner* — Regis J Betsch
(74) *Attorney, Agent, or Firm* — Frank Lollo; Bejin Bieneman PLC (57) ABSTRACT

A system, comprising a processor and a memory. The memory stores instructions executable by the processor to determine, from an image including a portion of a surface of a human body, a reflected light intensity from the body surface portion, determine, a skin reflectance of the body surface portion based on a location of the body surface, a light source, and an image sensor location, and to determine, for the body surface portion, an incoming radiance, based on the skin reflectance and the reflected light intensity.

20 Claims, 9 Drawing Sheets (56) References Cited

OTHER PUBLICATIONS

Xiao et al., "Improved method for skin reflectance reconstruction from camera images" 2016, vol. 24, No. 13, Optics Express (Year: 2016).*

Zwinkels, "Colour-measuring instruments and their calibration", Displays vol. 16 No. 4 1996 (Year: 1996).*

Cooksey et al., "Spectral reflectance variability of skin and attributing factors." Radar Sensor Technology XIX; and Active and Passive Signatures VI. vol. 9461. International Society for Optics and Photonics, 2015.

Hiscocks et al., "Measuring luminance with a digital camera." Syscomp electronic design limited 686 (2011).

\* cited by examiner

OCCUPANT LIGHT EXPOSURE DETECTION

BACKGROUND

Light from light sources such as the sun can enter a vehicle cabin through vehicle windows. Thus, a vehicle occupant may be exposed to light. A location of an occupant in the vehicle, a direction and a location of the vehicle, etc., may affect which portion of an occupant's body is exposed to the light. Exposure to a light such as sunlight may cause discomfort for the occupant, may interfere with occupant vision, or cause other difficulties.

DETAILED DESCRIPTION

Introduction

Disclosed herein is a system, comprising a processor and a memory. The memory stores instructions executable by the processor to determine, from an image including a portion of a surface of a human body, a reflected light intensity from the body surface portion, to determine, a skin reflectance of the body surface portion based on a location of the body surface, a light source, and an image sensor location, and to determine, for the body surface portion, an incoming radiance, based on the skin reflectance and the reflected light intensity.

The instructions may further include instructions to determine the skin reflectance also based on a pose of the body surface portion, the reflected intensity, a second incoming radiance of the light source, an angle of incidence to the body surface portion, and an angle of reflection from the body surface portion.

The light source may be a vehicle light source and the instructions further include instructions to store data including the second incoming radiance of the vehicle light source.

The instructions may further include instructions to determine the second incoming radiance based on the reflected light intensity from a vehicle part and data including reflectance of the vehicle part.

The instructions may further include instructions to determine a second incoming radiance for a second light wavelength substantially filtered out by a camera sensor based on (i) the incoming radiance for a first light wavelength included in the image, and (ii) data specifying a camera sensitivity to at least the first and second light wavelengths.

The instructions may further include instructions to determine the incoming radiance of the body surface portion based on a transmittance of a window glass or a weather condition.

The body surface portion of the human body may be one of a forehead body surface portion, a face-to-cheek body surface portion, a chin body surface portion, a hand, a chest, a thigh, a knee, an arm, and a leg.

The instructions may further include instructions to input data including a vehicle location, a body surface portion location, a wavelength of the reflected light intensity, and the light source to a machine learning program and to determine a bidirectional reflectance function based on an output of the machine learning program.

The machine learning program may be a neural network trained based on a specified incoming radiance and received reflected light intensity.

The instructions may further include instructions to determine the incoming radiance based on the determined bidirectional reflectance function.

The instructions may further include instructions to determine an incoming radiance of each pixel included in the identified body surface portion, and to determine the incoming radiance of the body surface portion based on an average of the incoming radiances of the pixels.

The instructions may further include instructions to actuate, based on the determined incoming radiance, a vehicle cooling actuator, a window tinting actuator, a visor, a seat adjustment actuator, an airflow aiming actuator, or a vehicle heating actuator.

The determined skin reflectance may specify (i) an average reflectance across a plurality of wavelength ranges, or (ii) a reflectance for a specific wavelength range.

Further disclosed herein is a method, comprising determining, from an image including a portion of a surface of a human body, a reflected light intensity from the body surface portion, determining, a skin reflectance of the body surface portion based on a location of the body surface, a light source, and an image sensor location, and determining, for the body surface portion, an incoming radiance, based on the skin reflectance and the reflected light intensity.

The method may further include determining the skin reflectance also based on a pose of the body surface portion, the reflected intensity, a second incoming radiance of the light source, an angle of incidence to the body surface portion, and an angle of reflection from the body surface portion.

The method may further include determining the second incoming radiance based on the reflected light intensity from a vehicle part and data including reflectance of the vehicle part.

The method may further include determining a second incoming radiance for a second light wavelength substantially filtered out by a camera sensor based on (i) the incoming radiance for a first light wavelength included in the image, and (ii) data specifying a camera sensitivity to at least the first and second light wavelengths.

The method may further include determining the incoming radiance of the body surface portion based on a transmittance of a window glass or a weather condition.

The method may further include inputting data including a vehicle location, a body surface portion location, a wavelength of the reflected light intensity, and the light source to a machine learning program and determining a bidirectional reflectance function based on an output of the machine learning program.

The method may further include actuating, based on the determined incoming radiance, a vehicle cooling actuator, a window tinting actuator, a visor, a seat adjustment actuator, an airflow aiming actuator, or a vehicle heating actuator.

Further disclosed is a computing device programmed to execute any of the above method steps. Yet further disclosed is a vehicle comprising the computing device.

Yet further disclosed is a computer program product comprising a computer-readable medium storing instructions executable by a computer processor, to execute any of the above method steps.

Exemplary System Elements

Technical improvements disclosed and claimed herein relate to determining an intensity of light radiance on a person's body, e.g., intensity of sunlight on a skin surface of a vehicle occupant. In an example implementation, a vehicle computer can be programmed to determine, from an image including a portion of a surface of a human body, a reflected light intensity from the body surface portion, and to determine a skin reflectance of the body surface portion based on a location of the body surface, a light source, and an image sensor location. The computer can be further programmed to determine, for the body surface portion, an incoming radiance, based on the skin reflectance $\rho$ and the reflected light intensity $L_r$. Therefore, the present disclosure advantageously overcomes present shortcomings in determining radiance intensity without a sensor directed toward the light source generating the radiance.

Figure 1:
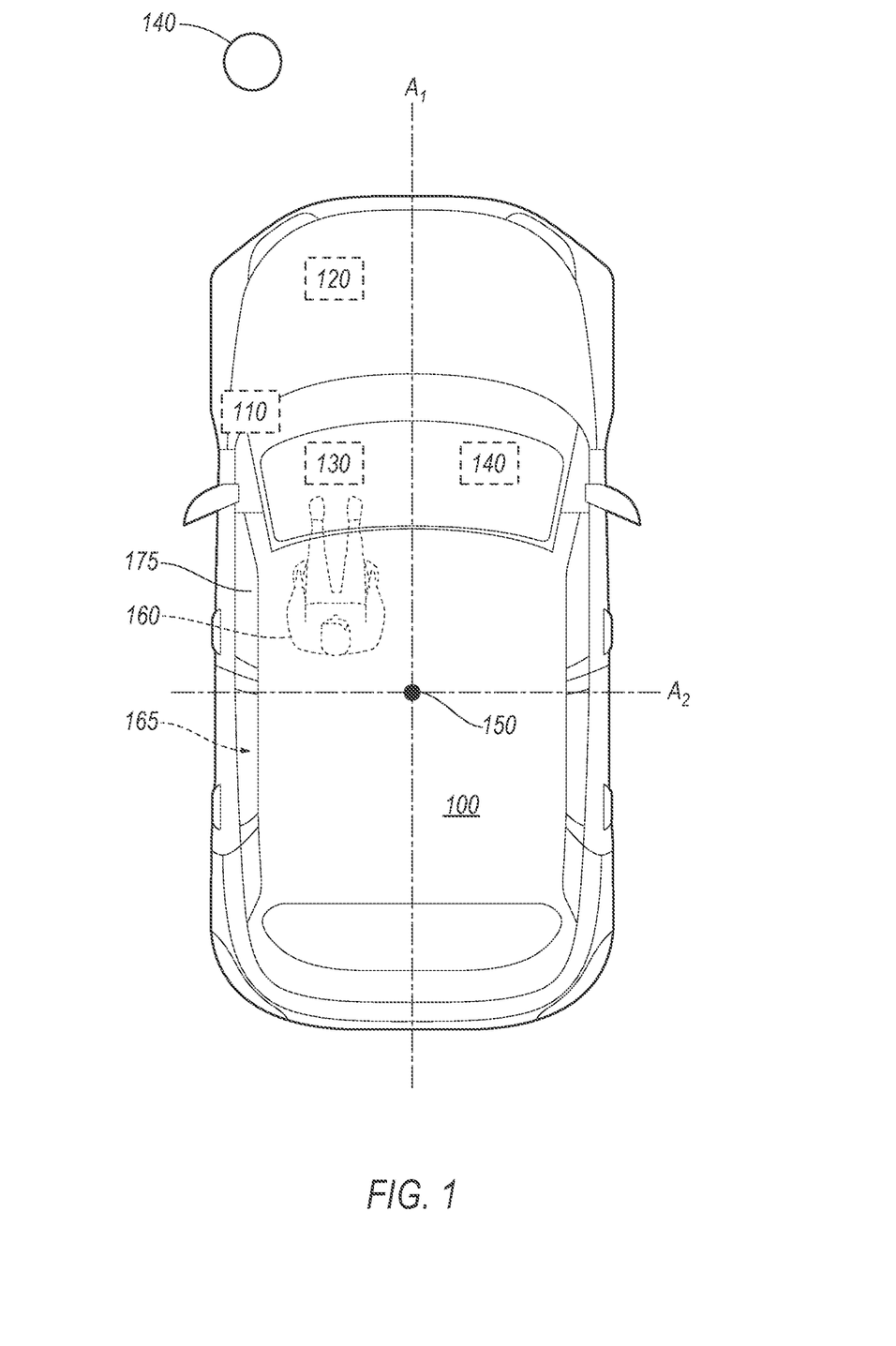
FIG. 1 is a diagram illustrating an example vehicle and vehicle occupant.

FIG. 1 illustrates a vehicle 100, and an occupant body 160. The vehicle 100 may be powered in a variety of ways, e.g., with an electric motor and/or internal combustion engine. The vehicle 100 may be a land vehicle such as a car, truck, etc. A vehicle 100 may include a computer 110, actuator(s) 120, sensor(s) 130, and a light source 140. Additionally or alternatively, a light source 140 may be a light source exterior to the vehicle 100, e.g., sun, streetlight, etc.

The vehicle 100 can have a reference point 150, in the present example a geometric center (i.e., a point where a longitudinal axis A1 and a lateral axis A2 of a vehicle 100 body intersect), but could be some other specified point. The vehicle 100 may include an interior 165, i.e., a passenger cabin or some other interior compartment that could be occupied by a human. The vehicle 100 interior 165 is a space inside the vehicle 100. One or more occupants 160 may be in the vehicle 100. The vehicle 100 typically has one or more windows 175. A window 175 in the present context, is an opening of a vehicle 100 body covered by a transparent or semi-transparent material such as glass which allows light from an exterior of the vehicle 100, e.g., from a sunlight source 140 penetrate the vehicle 100 interior 165. A window 175 may be openable, e.g., side windows, or fixed, such as a front windshield.

The computer 110 includes a processor and a memory such as are known. The memory includes one or more forms of computer-readable media, and stores instructions executable by the computer 110 for performing various operations, including as disclosed herein.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, a sensor 130, etc. Alternatively or additionally, in cases where the computer 110 comprises multiple devices, the vehicle 100 communication network may be used for communications between devices represented as the computer 110 in this disclosure. As discussed further below, various electronic controllers and/or sensors 130 may provide data to the computer 110 via the vehicle communication network.

The vehicle 100 actuators 120 are implemented via circuits, chips, or other electronic and/or mechanical components that can actuate various vehicle subsystems in accordance with appropriate control signals, as is known. The actuators 120 may be used to control vehicle 100 systems such as braking, acceleration, and/or steering of the vehicles 100. For example, the vehicle 100 may include a cooling and/or heating actuator 120 to cool and/or heat the interior 165 of the vehicle 100. The computer 110 may be programmed to actuate the cooling actuator 120 to blow air in the interior 165. The computer 110 may be programmed to actuate one or more valve actuators 120 to control a flow of air in the vehicle 100, e.g., closing a vent in a rear portion of the interior 165 while keeping another vent in a front portion of the interior 165 open. The computer 110 may be programmed to change a temperature of the air outputted from the cooling and/or heating actuator 120, e.g., based on an exposure of a vehicle 100 occupant body 160 to heat or cold, as discussed below. The computer 110 may be programmed to actuate a vehicle 100 actuator 120 to aim a vent to a surface portion 170. For example, the computer 110 may be programmed to actuate an electromechanical airflow aiming actuator 120, mechanically connected to vent blades, to change a direction of air output from the vent to a location of the surface portion 170.

The vehicle 100 may include a tinting actuator 120 to adjust a transmittance of one or more windows 175. In the present context, the transmittance of a material, e.g., glass, Plexiglas, etc., is material's effectiveness in transmitting (passing through) radiant energy, which may be specified in a percentage at a specific wavelength of light. Transmittance of a tintable window 175 glass may be adjustable. For example, transmittance of electrochromic glass may be controlled by an amount of an electrical voltage applied to the glass. The computer 110 may be programmed to actuate an actuator 120 to apply a voltage to a window 175 glass to adjust the window 175 transmittance, thereby reducing or increasing the amount of light penetrating the vehicle 100 interior 165 through the respective window 175.

The vehicle 100 may include a visor adjustment actuator 120 to adjust a visor location. A visor is typically used in a vehicle 100 to adjust an exposure of an occupant body 160 to a light source 140, e.g., sunlight, a streetlight, etc. The vehicle 100 may include an electromechanical actuator 120, e.g., an electric motor, to change a location of the visor, e.g., moving up or down, right or left, rotate, etc.

The vehicle 100 may include a seat adjustment actuator 120 to move a vehicle 100 seat. The computer 110 may be programmed to actuate a seat actuator 120 to move a vehicle 100 seat forward, backward, laterally, up and down, etc. Additionally or alternatively, the computer 110 may be programmed to change a seat inclination by actuating an actuator 120, e.g., an electrical motor that is mechanically coupled to a back section of the vehicle 100 seat.

Vehicle 100 sensors 130 may include a variety of devices known to provide data via the vehicle communications bus. For example, the sensors 130 may include one or more camera, radar, infrared, and/or LIDAR sensors 130 disposed of in the vehicle 100 and/or on the vehicle 100 providing data encompassing at least some of the vehicle 100 interior 165 and exterior. The data may be received by the computer 110 through a suitable interface. A vehicle 100 interior camera sensor 130 may provide image data from the interior 165, e.g., including occupant body 160.

Vehicle 100 light sources 140 may include various types of light-producing components, e.g., light bulb, light-emitting diode (LED), etc. A light source 140 may generate light in a specified wavelength range, e.g., visible light, near-infrared (NIR), etc. Visible light wavelengths may be in a range of 400 to 700 nanometer (nm). Near-infrared light wavelengths may be within a range of 800 to 2600 nm. For example, the computer 110 may be programmed to actuate a vehicle 100 light source 140 to illuminate at least a portion of a vehicle 100 interior 165, e.g., one or more seats, with a light beam including near-infrared light. The computer 110 may be programmed to actuate the vehicle 100 light source 140 to output light with specified light intensity. Luminosity or light intensity L is a measure of the wavelength-weighted power emitted by a light source, based on a standardized model of the sensitivity of the human eye. The unit of luminous intensity defined by the International System of Units (SI) is the candela (cd).

Figure 2:
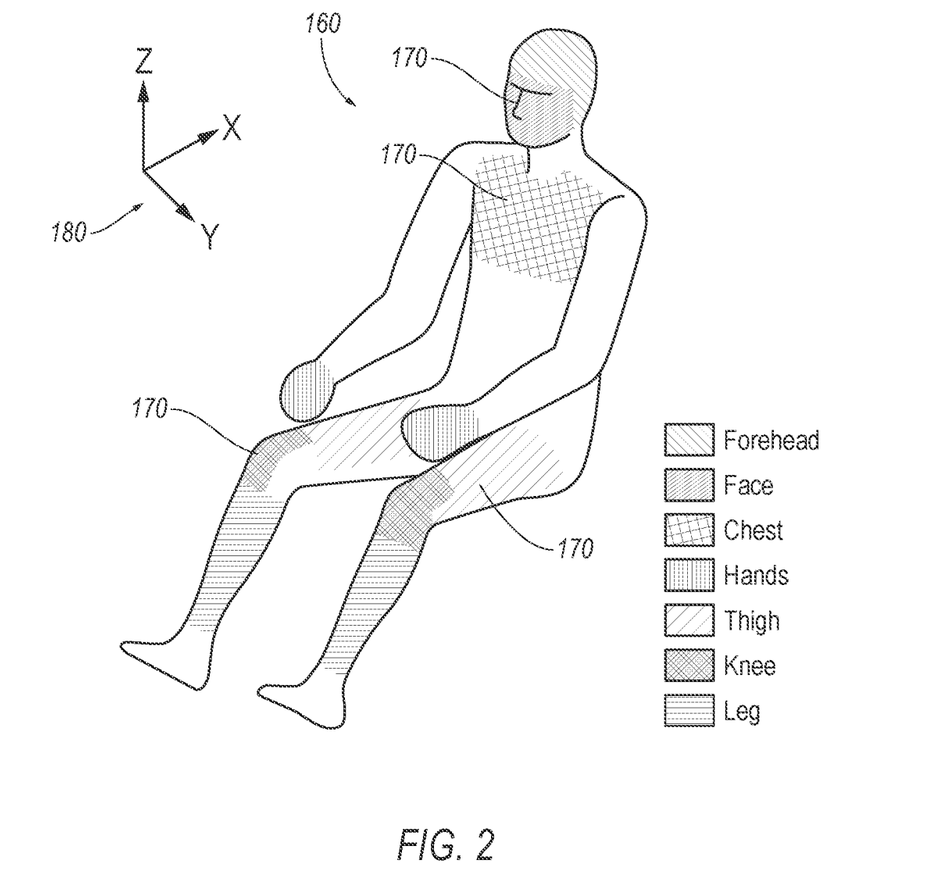
FIG. 2 shows body surface portions of the vehicle occupant.

FIG. 2 shows an occupant body 160, e.g., a human on a vehicle 100 seat. In the present context, an occupant body 160 surface may be divided into multiple surface portions 170, e.g., a forehead, a face-to-cheek, a chin, a hand, a chest, a thigh, a knee, an arm, and/or a leg. Additionally, in the present context, a surface portion 170 may be a portion of a vehicle 100 interior 165 part, i.e., a physical structure in the vehicle such as a headrest, seat, etc. Although examples discussed below refer to a body of a vehicle 100 occupant 160, the human body may be located elsewhere, e.g., on a seat in a room, etc. Additionally or alternatively, a surface portion 170 may be a portion of a surface of a material outside a vehicle 100, e.g., a surface in a room, a lab, a production facility, etc. The computer 110 may be programmed to receive image data from a vehicle 100 camera sensor 130 and identify one or more surface portions 170 of an occupant 160 body in the received image, e.g., using conventional image segmentation techniques.

With reference to FIGS. 1-2, the computer 110 can be programmed to determine, from an image including a portion 170 of a surface of a human body 160, a reflected light intensity $L_r$ from the occupant body 160 surface portion 170. A skin reflectance ρ of the body 160 surface portion 170 can be determined based on a location of the body surface 160, a light source 140, and an image sensor 130 location. Then for the body 160 surface portion 170, an incoming radiance $L_i$ can be determined based on the skin reflectance ρ and the reflected light intensity $L_r$.

A location of a sensor 130 may be specified with respect to a coordinate system, e.g., a Cartesian coordinate system 180 with an origin in or outside the vehicle 100. Additionally, the computer 110 may store a pose (roll, pitch, and/or yaw) of the camera sensor 130 relative to the coordinate system 180. The computer 110 may be programmed to determine the location of the camera sensor 130 relative to a coordinate system with an origin outside the vehicle 100, e.g., an origin of the GPS (global positioning system), based on the location of the sensor 130 relative to the coordinate system 180 with an origin in the vehicle 100 and the location of the vehicle 100 relative to the coordinate system with the origin outside the vehicle 100.

$L_r$ represents an intensity (or luminance) of reflected light from an occupant 160 skin, e.g., specified in cd or any other light intensity unit. The computer 110 may be programmed to determine the light intensity of an image pixel based on the received image data. For example, image data may include a brightness measure, e.g., in a scale of 0 to 100%, cd, etc., for each image pixel. The computer 110 may be programmed to determine a reflected light intensity $L_r$ for a pixel of a received image based on the received brightness of the pixel. Additionally, the computer 110 may be programmed to determine, based on data received from the camera sensor 130, a reflected light intensity $L_r$ for various wavelength ranges in the received reflected light. In one example, a camera sensor 130 may be configured to distinguish between intensity of various received light wavelengths, e.g., by including multiple light filters. The computer 110 may be programmed to determine a first reflected light intensity $L_r$ for visible light wavelength range and a second light intensity $L_r$ for near-infrared wavelength range, etc., based on data received from the camera sensor 130. Additionally or alternatively, the computer 110 may be programmed to determine an intensity of light at an image pixel and then translate the determined intensity to luminescence based on camera sensor 130 properties such as exposure time in a specific wavelength range, properties of a color filter included in the camera sensor 130, etc.

Figure 3:
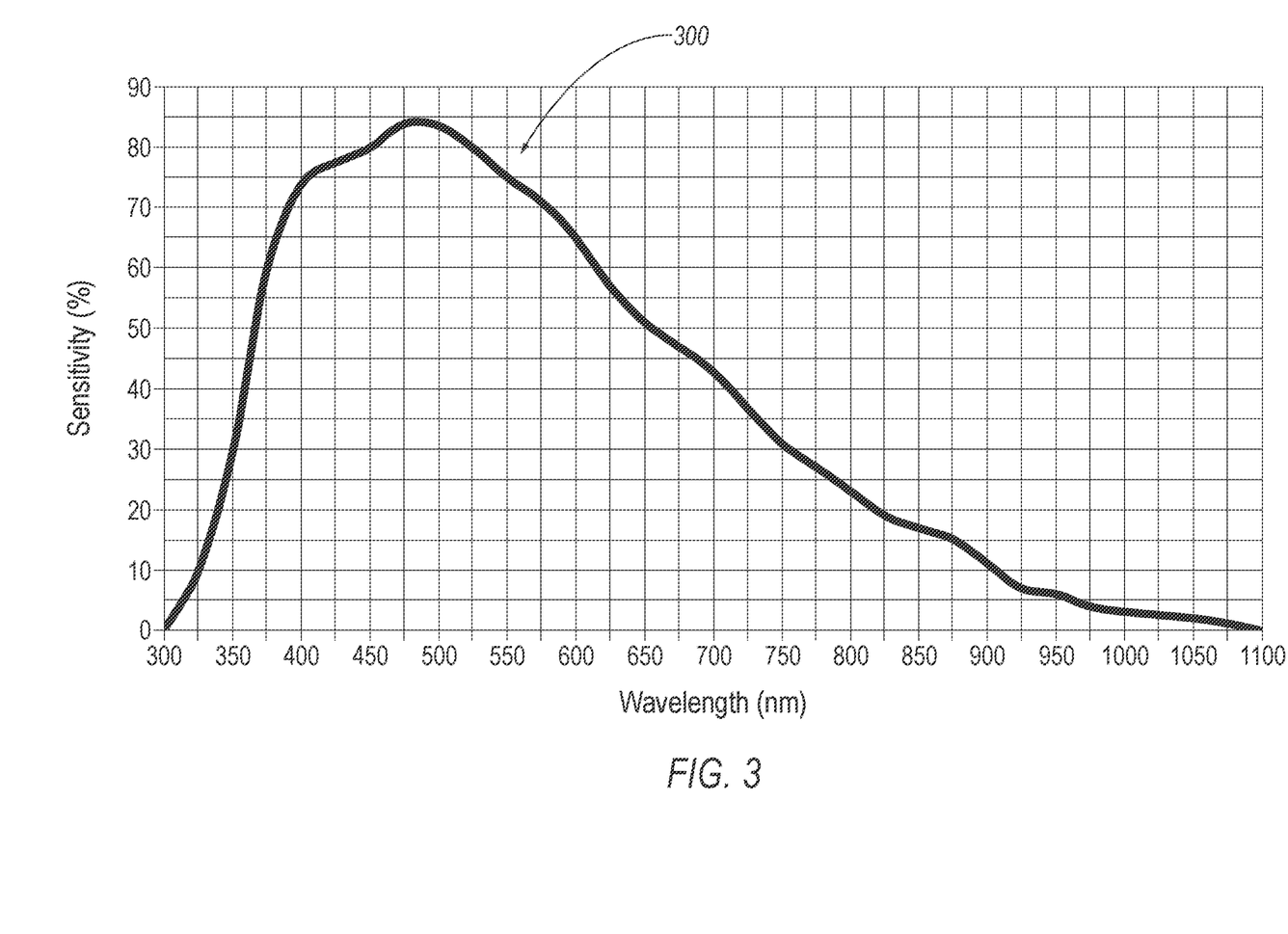
FIG. 3 is an example graph illustrating a change of camera sensitivity based on a wavelength of received light.

A camera sensor 130 sensitivity may vary based on the wavelength of received light. A sensitivity of the camera sensor 130 for a given wavelength, in the present context, is a measurement of a capability of the camera sensor 130 in detecting received light with the respective wavelength, e.g., specified on a scale of 0 to 100%. FIG. 3 is an exemplary graph 300 which illustrates a change of sensitivity of a camera sensor 130 based on a wavelength of received light. The computer 110 may be programmed to determine the reflected light intensity $L_r$ further based on the sensitivity of the camera sensor 130. For example, as shown in the exemplary graph 300, the camera sensor 130 has a sensitivity of 20% at 825 nm. Thus, the computer 110 may determine a reflected light intensity $L_r$ of 5 cd for light at a received wavelength of 825 nm upon determining a 1 cd received intensity based on the received image data. In other words, the computer 110 may estimate an intensity of 5 cd based on determining that 20% of the intensity received at the camera sensor 130 is 1 cd.

An occupant body 160 surface portion 170 and/or vehicle 100 interior 165 part surface portion 170 may be illuminated by one or more light sources 140, e.g., (i) exterior light sources such as the sun or a streetlight, and/or (ii) interior light sources 140 such as a vehicle 100 interior light 140. In the present context, incoming radiance $L_i$ is an intensity of light hitting a surface portion 170. Thus, reflected light intensity $L_r$ of a surface portion 170 represents intensity of reflections of light with intensity $L_i$ hitting the respective surface portion 170. Incoming light may include one or more ranges of wavelengths, e.g., visible light, near-infrared light, etc. In one example, an incoming radiance $L_i$ may specify an average intensity value for multiple wavelengths included in the incoming light, e.g., an average intensity of 5 cd for wavelength range of 300 to 2600 nm. In another example, an incoming radiance $L_i$ may specify a first intensity value for a first wavelength range, e.g., visible light, and a second intensity value for a second wavelength range, e.g., near-infrared.

In the present context, a reflectance ρ of a surface portion 170 measures an effectiveness of the surface in reflecting radiant energy. A reflectance ρ may specify (i) an average reflectance for a wavelength range, e.g., a reflectance ρ of 0.55 for a wavelength range of 700 to 1300 nm, or (ii) a reflectance for a specific wavelength, e.g., a reflectance ρ of 0.33 at 600 nm. In the present context, a reflectance ρ of a surface portion 170 may specify the reflectance of a point represented in an image pixel in the received image data or an average reflectance determined based on a plurality of pixels.

Figure 4:
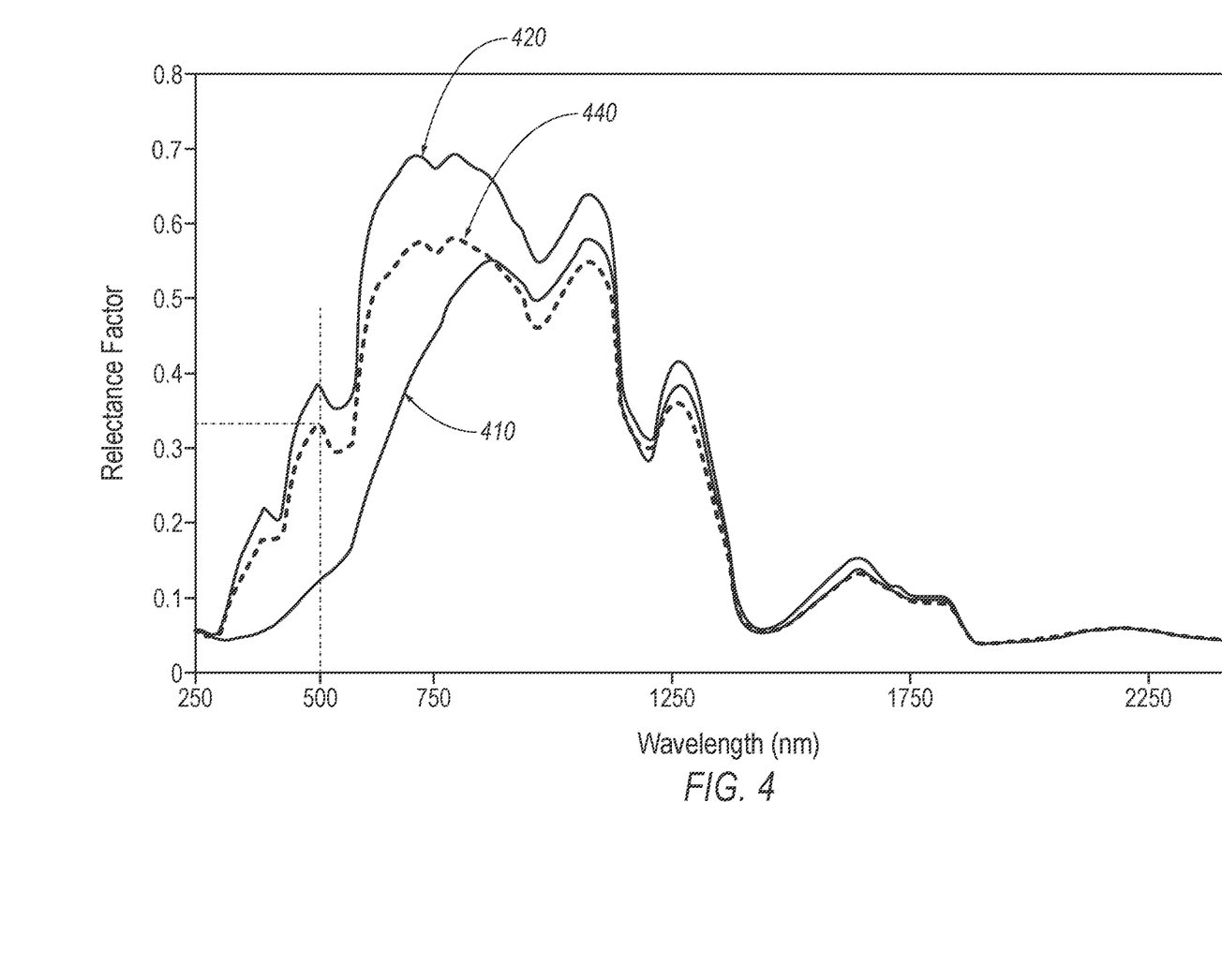
FIG. 4 is an exemplary graph showing changes of a human skin reflectance versus light wavelength.

A reflectance ρ of a material surface, e.g., human skin, is typically within a range of a minimum reflectance $\rho_{min}$ and a maximum reflectance $\rho_{max}$. For example, a human skin reflectance ρ may vary based on a skin tone. FIG. 4 shows graphs 410, 420, 430 which illustrate changes of a minimum reflectance $\rho_{min}$, a maximum reflectance $\rho_{max}$, and a mean reflectance $\rho_{mean}$. In the present context, "mean" is an average value of a discrete set of numbers, i.e., the sum of the values divided by the number of values.

Figure 5:
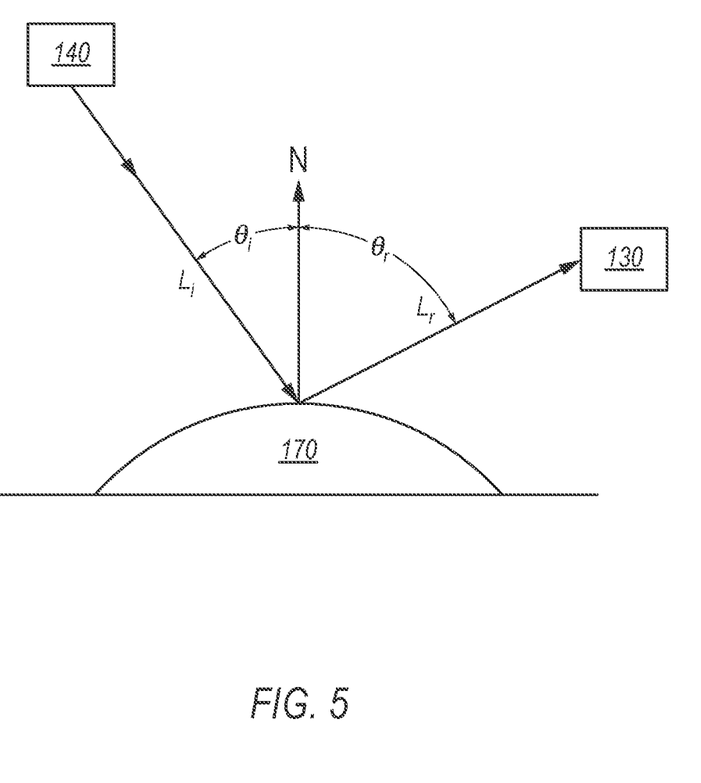
FIG. 5 is a diagram showing a reflection of light on a surface portion.

FIG. 5 illustrates a reflection of light from a surface portion 170. Vector N is a normal vector, i.e., a line perpendicular to the surface portion 170 at a point of reflection. The light is illuminating the surface portion 170 with an angle of incidence $\theta_i$ and reflection of the light is received by the camera sensor 130 viewing the surface with an angle of reflection $\theta_r$. Equation (1) below specifies the received reflection intensity $L_r$ based on a bidirectional reflectance function $\rho(\theta_i, \theta_r)$ and the incoming radiance L.

$$L_r = \rho(\theta_i, \theta_r) L_i \cos \theta_i \quad (1)$$

Thus, a reflectance ρ of a surface portion 170 may be determined based on a specified reflectance function $\rho(\theta_i, \theta_r)$ and angles $\theta_i, \theta_r$. As discussed below, the computer 110 may be programmed to implement Equation (1) to determine an incoming radiance L or the reflectance ρ of a surface portion 170. A reflectance function $\rho(\theta_i, \theta_r)$ may be any mathematical function specifying a reflectance of a surface portion 170 based on the angles $\theta_i, \theta_r$. Additionally or alternatively, a reflectance function $\rho(\theta_i, \theta_r)$ may be specified in form of a table or the like specifying a reflectance for a combination of angles $\theta_i, \theta_r$. A reflectance function is typically specific to a type of material, e.g., human skin, leather, plastic, etc. In the present context, the computer 110 may store a reflectance function $\rho(\theta_i, \theta_r)$ that is specific to a particular surface portion 170, e.g., the forehead of an occupant 160. A location of a surface portion 170, in the present context, includes a location and a pose of the surface portion 170. For example, with reference to FIG. 5, a location of a surface portion 170 may include 3D location coordinates of the surface portion 170 and a direction of the normal vector N perpendicular to the surface portion 170.

The computer 110 can be programmed to determine, from an image including a portion 170 of a surface, e.g., of a human body 160, a reflected light intensity $L_r$ from the body 160 surface portion 170. The computer 110 can further be programmed to then determine a skin reflectance ρ of the body 160 surface portion 170 based on a location of the body 160 surface portion 170, a light source 140, and an image sensor 130 location. The computer 110 may be programmed to determine the angle of incidence $\theta_i$ based on the surface portion 170 location, the sensor 130 location, and the light source 140 location.

The computer 110 may be programmed to determine the location of the surface portion 170 using image processing techniques based on the received image data from the camera sensor 130 and the specified location of the camera sensor 130 with respect to the coordinate system 180. The computer 110 may be programmed to determine the location of an external light source 140, e.g., the sun, using conventional techniques such as implementing a sky dome model. A Sky dome model, as will be understood, is a model developed, based on astronomical techniques, that estimates location of the sun, moon, and/or other planets in the sky relative to a coordinate system, e.g., the coordinate system 180, based a time of day, season, etc. The computer 110 may be programmed to determine the location of a vehicle 100 light source 140 based on data stored in a computer 110 memory. The computer 110 may store data specifying location coordinates of an interior 165 light source 140 relative to a coordinate system, e.g., the coordinate system 180. Thus the computer 110 may be programmed to determine the angle of incidence $\theta_i$ based on the location of the surface portion 170 and the location of the light source 140.

The computer 110 may be programmed to determine the angle of reflection $\theta_r$ based on the location of the camera sensor 130, e.g., stored in the computer 110 memory, and the location of the surface portion 170. The computer 110 can be programmed to implement Equation (1) to determine the reflectance ρ of the surface portion 170 based on the angles $\theta_i, \theta_r$, and to determine an incoming radiance $L_i$ based on the determined reflectance ρ and the reflected light intensity $L_r$.

A surface portion 170 is typically represented in a camera image by multiple pixels. In one example, the computer 110 may be programmed to determine an incoming radiance $L_i$ of each pixel included in representing the identified body 160 surface portion 170, and to determine the incoming radiance $L_i$ of the body 160 surface portion 170 based on an average of the incoming radiances $L_i$ of the pixels.

The computer 110 may be programmed to input data including a vehicle 100 location, a body surface portion 170 location, a wavelength of the reflected light intensity $L_r$, and the light source 140 to a machine learning program that outputs the bidirectional reflectance function $\rho(\theta_i, \theta_r)$. The machine learning program may be a convolutional neural network (CNN) trained based on a specified incoming radiance $L_i$ and received reflected light intensity $L_r$. The vehicle 100 location, e.g., received from a vehicle 100 GPS sensor 130, is a location of the vehicle 100, e.g., a location of the reference point 150, with respect to a coordinate system 180 with an origin, e.g., a GPS reference point defined by GPS coordinates, outside the vehicle 100. The vehicle 100 location data may include a vehicle 100 pose including roll, pitch, and yaw, e.g., based on data received from a vehicle 100 sensor 130. The computer 110 may determine the body surface portion 170 location, based on the received image data, with respect to a coordinate system with an origin at, e.g., the vehicle 100 reference point 150. The computer 110 may be programmed to determine the location of the surface portion 170 with respect to the coordinate system 180 based on (i) the location of the vehicle 100 with respect to the coordinate system 180 and (ii) the location of the surface portion 170 with respect to the vehicle 100 reference point 150. Thus, by determining the location of (i) the light source 140, (ii) the body 160 surface portion 170, and (iii) the vehicle 100 sensor 130, relative to a same coordinate system, e.g., the coordinate system 180, the computer 110 may be programmed to determine the angles $\theta_i, \theta_r$.

A CNN is a software program that can be implemented on a computing device that can be trained to input vehicle 100 data and output data determining the reflectance function $\rho(\theta_i, \theta_r)$. A CNN includes a plurality of convolutional layers that extract hidden features from input data of a vehicle 100 which are passed to a plurality of fully-connected layers that transform the hidden features into a determination of the reflectance function $\rho(\theta_i, \theta_r)$.

The CNN can be trained by (i) inputting ground truth data including a set of inputs and respective output data, and (ii) backpropagating results to be compared with the ground truth to determine a loss function. A loss function is used to optimize the parameter values in a neural network model. Loss functions map a set of parameter values for the network onto a scalar value that indicates how well those parameters accomplish the task the neural network is intended to perform.

Back-propagation is a technique that returns output states from a CNN to the input to be compared to corresponding ground truth. In this example, during training the output reflectance can be back-propagated to be compared to the reflectance included in the ground truth to determine a loss function. The loss function determines how accurately the CNN has processed the input data. A CNN can be executed a plurality of times on a set of ground truth data while varying parameters that control the processing of the CNN. Parameters that correspond to correct answers as confirmed by a loss function that compares the output states to the ground truth are saved as candidate parameters. Following the test runs, the candidate parameters that produce the most correct results are saved as the parameters that will be used to program the CNN during operation.

The ground truth data may include multiple sets of reflections and incoming intensities $L_i$, $L_r$, angles $\theta_i$, $\theta_r$, and respective reflectances $\rho$. Thus, by inputting a large number, e.g., thousands, sets of ground truth data, the CNN may be trained to determine a reflectance function $\rho(\theta_i, \theta_r)$ for the respective surface portion 170. Training the CNN includes determining parameters for convolutional and fully-connected layers that minimize an error between an output of the CNN and a respective expected output.

In one example, the computer 110 may be programmed to receive ground truth data, e.g., from a computer 110 memory, a remote computer, etc. Additionally or alternatively, the computer 110 may be programmed to determine ground truth data based on nighttime illumination of the vehicle 100 interior 165 using one or more vehicle 100 light sources 140. Data stored in the computer 110 memory may specify the vehicle 100 light source 140 light intensity $L_i$, e.g., 5 cd, wavelength of output light, e.g., near-infrared, etc. In other words, in the nighttime, natural light sources 140 such as the sun are not available, and the intensity and wavelength of light generated by the vehicle 100 light sources 140 are typically known, whereby a respective reflectance $\rho$ can be determined using Equation (1). The computer 110 may be programmed to determine the skin reflectance $\rho$ based on a pose of the body 160 surface portion 170, the reflected intensity $L_r$, an incoming radiance $L_i$ of the light source 140, e.g., interior 165 light, an angle of incidence $\theta_i$ to the body 160 surface portion 170, and an angle of reflection $\eta_r$ from the body 160 surface portion 170.

In some examples, a reflectance $\rho$ of a surface portion 170, e.g., vehicle 100 seat, may be known, and can be stored in a computer 110 memory. Based on a stored reflectance $\rho$ of a vehicle 100 surface portion 170, the computer 110 may be programmed to implement Equation (1) to determine the incoming radiance $L_i$ based on the reflected light intensity $L_r$. Thus, the computer 110 may be programmed to determine an incoming light intensity $L_i$ of an external light source 140, e.g., sunlight, and store the determine light intensity $L_i$ of the respective light source 140. Upon determining the incoming radiance $L_i$ of a light source 140, the computer 110 may be programmed to determine a reflectance $\rho$ of a human skin surface portion 170 based on reflected light intensity $L_r$ of the human skin and the determined incoming radiance $L_i$ of the light source 140.

As discussed above with respect to FIG. 3, the camera sensor 130 sensitivity may vary based on the wavelength of received light. The computer 110 may be programmed to determine a first incoming radiance $L_i$ for a first light wavelength $w_1$ substantially filtered out by a camera sensor 130 based on (i) the incoming radiance $L_i$ for a second light wavelength $w_2$, and (ii) data specifying a camera sensitivity such as shown in the exemplary graph 300.

For example, upon determining an incoming intensity $L_1$ of visible light from sunlight source 140, the computer 110 may be programmed to determine an infrared light intensity $L_i$, although the camera sensor 130 image data lacks received infrared light intensity data. The computer 110 may store data specifying that the intensity of infrared light included in sunlight is about half of the intensity of visible light included in the sunlight. Thus, in this example, upon determining a visible light intensity $L_i$ of 5 cd, the computer 110 may be programmed to determine that an infrared light intensity $L_i$ of 2.5 cd is illuminating the respective surface portion 170.

Figure 6:
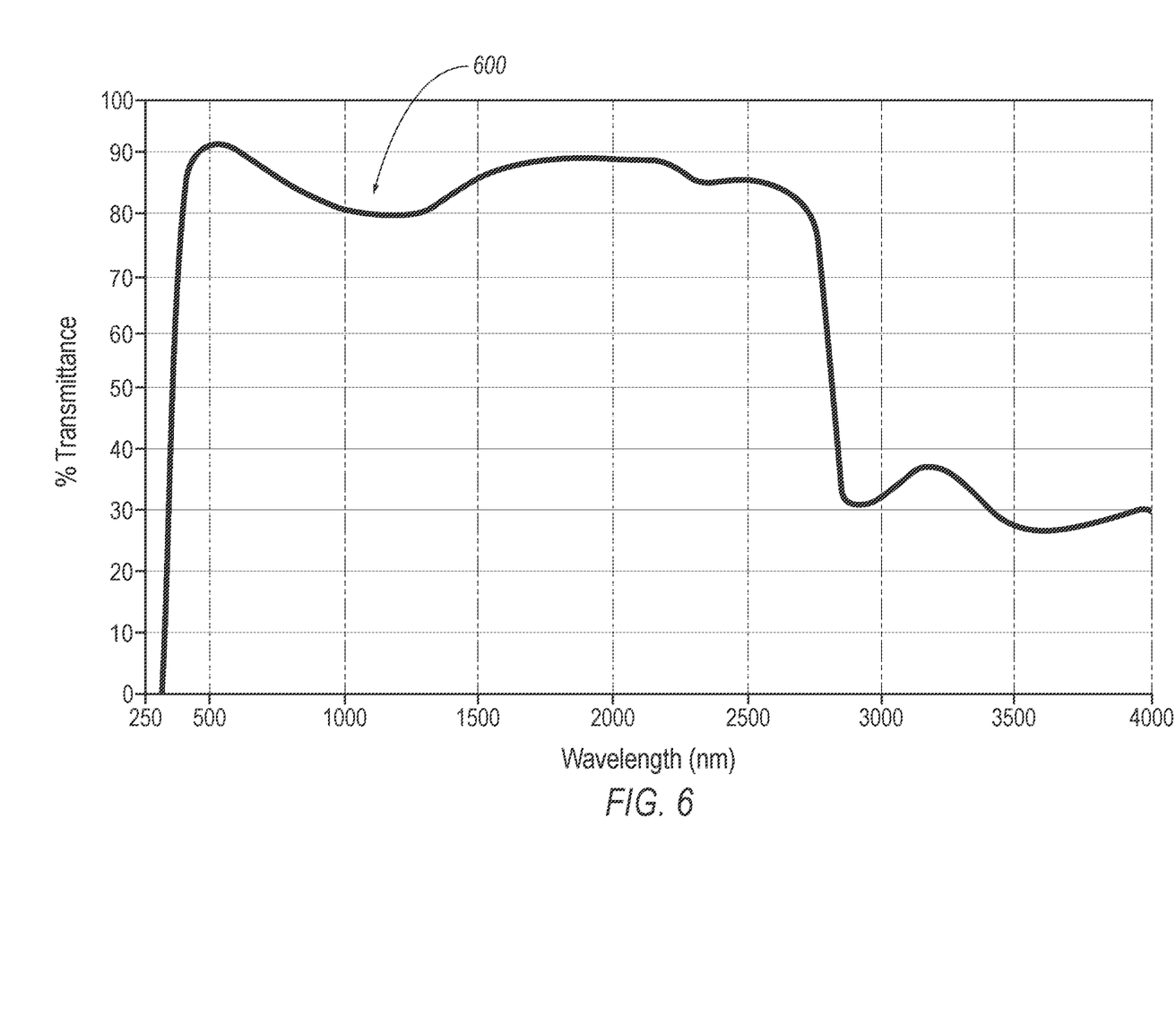
FIG. 6 is an exemplary graph illustrating changes of transmittance of glass versus wavelength.

FIG. 6 is an exemplary graph 600 illustrating a change of glass transmittance based on a wavelength of light passing through the glass. Transmittance of a material measures a fraction, e.g., specified in a percentage of incident electromagnetic power that is transmitted through the material. Thus, upon passing through a vehicle 100 window 175, some wavelengths of incoming light, e.g., sunlight, may be filtered out or weakened. For example, as shown in example graph 600, wavelengths in a range of 600 to 2600 nm may substantially pass through the window 175 (transmittance exceeding 80%), while other wavelengths may be suppressed.

The computer 110 may be programmed to store transmittance data specifying a transmittance of the window 175 glass corresponding to one or more wavelengths ranges, e.g., as shown in the graph 600. In another example, in a vehicle 100 with multiple windows 175 including different material, the computer 110 may store a first set of transmittance data for a first window 175 and a second set of transmittance data for a second window. The computer 110 may be programmed to identify a window 175 through which light from an external light source 140, e.g., sunlight, enters the vehicle 100 interior 165 based on a location of the window 175, a location of the light source 140, and a location of the surface portion 170, e.g., by determining that an imaginary line from the light source 140 to the surface portion 170 crosses the window 175, e.g., with respect to a 3D coordinate system, e.g., the coordinate system 180.

A weather condition may affect light coming from an external light source, e.g., sunlight. For example, inclement weather conditions such as rain, fog, cloud, etc., may weaken light at various wavelengths. The computer 110 may be programmed to receive weather data including type of weather condition, e.g. rain, fog, etc., and corresponding transmittance of the weather condition. The received transmittance data may specify a transmittance of the weather condition, e.g., as shown in the graph 600. In another example, the computer 110 may be programmed to determine the transmittance data based on the received weather condition data. For example, the computer 110 may store data, e.g., as shown in Table 1, and determine the transmittance of the weather condition based on the received weather data and the stored data. Additionally or alternatively, the received weather data may include incoming light intensity $L_i$ for various locations. The computer 110 may be programmed to determine, e.g., through interpolation techniques, the incoming light intensity $L_i$ at the vehicle 100 location using the received values for nearest geographical locations to the vehicle 100 location.

TABLE 1

| Weather type | wavelength range 1, e.g., visible light | wavelength range 2 | ... |
|---|---|---|---|
| Clear | 95% | 95% | ... |
| Rain | 80% | 60 | ... |
| Sandstorm | 30% | 20% | ... |
| Fog | 60% | 40% | ... |

The computer 110 may be programmed to determine the incoming radiance $L_i$ of the body 160 surface portion 170 based on a transmittance of a window 175 glass and/or a weather condition. In one example, the computer 110 may determine an incoming visible light intensity $L_i$ of 5 cd based on the reflected light intensity $L_r$ of visible light wavelength, the reflectance ρ of the surface portion 170, and the angles $\theta_i$, $\theta_r$. The computer 110 may estimate an incoming radiance $L_i$ of infrared wavelengths based on the determined incoming radiance $L_i$ for visible light wavelengths and transmittance of a vehicle 100 window 175 and/or weather condition(s). The computer 110 may estimate an infrared incoming radiance $L_i$ of 4 cd upon determining that the light passes through a window 175 with a transmittance of 100% for visible light and a transmittance of 80% for infrared light wavelengths. The computer 110 may be programmed to estimate a near-infrared radiance $L_i$ of 4 cd upon determining that (i) the light passes though foggy weather condition with a transmittance of 40% for near-infrared and 60% for visible light, and (ii) determining a visible light radiance $L_i$ of 6 cd. The computer 110 may determine multiple weather conditions, e.g., snow and fog weather condition. For example, upon determining snow and fog weather conditions at a same time, the computer 110 may determine an effective transmittance based on a first weather condition, e.g., fog, and a second transmittance for a second weather condition, e.g., snow, and determine the effective transmittance based on the first and second transmittances, e.g., taking a maximum of the minimum of the first and second transmittances.

Radiance of light to a surface portion 170 will transfer heat, e.g., this may result in the discomfort of an occupant 160 when exposed to sunlight on forehead portion 170. The computer 110 may be programmed to actuate one or more actuators 120 to mitigate or reduce discomfort of an occupant 160. For example, the computer 110 may be programmed to actuate, based on the determined incoming radiance $L_i$, a vehicle 100 cooling actuator 120, a window 175 tinting actuator 120, a visor, a seat adjustment actuator 120, or a vehicle heating actuator 120.

The computer 110 may be programmed to actuate a window tinting actuator 120 to reduce transmittance of a window 175 upon determining that light passing through the respective window 175 results in a radiance on a body surface portion 170 exceeding a threshold, e.g., 10 cd. For example, the computer 110 may actuate the tinting actuator 120 to reduce the transmittance of the window 175 to a level that results in an incoming radiance $L_i$ of less than the threshold. For example, upon determining an incoming radiance $L_i$ of 11 cd and a threshold of 10 cd, the computer 110 may actuate the tinting actuator 120 to reduce the window 175 transmittance by 10%. The threshold may be determined using empirical testing data received from multiple test users. For example, a radiance level may be changes between a maximum, e.g., 30 cd, and a minimum radiance, e.g., 1 cd, and receive input from user specifying a radiance value that starts to cause discomfort. Inputs data may be received from a number of test occupants specifying a threshold of radiance that causes discomfort for each respective occupant. The threshold may be determined based on an average of the received input data and stored at the computer 110 memory.

The computer 110 may be programmed to actuate a heating or cooling actuator 120 based on the determined incoming radiance $L_i$. In one example, the computer 110 may be programmed to store a location and direction of heating cooling air vents in the vehicle 100 relative to, e.g., the coordinate system 180. The computer 110 may be programmed to estimate, using conventional thermodynamic models, a temperature of a human body 160 surface portion 170 based on the vehicle 100 interior 165 temperature and the determined incoming radiance $L_i$ directed to the surface portion 170.

The computer 110 may be programmed to actuate the vehicle cooling or heating actuator 120 to blow air to the surface portion 170 upon determining that an estimated surface portion 170 temperature is either below a first temperature threshold, e.g., 20 degrees Celsius, or exceeding a second threshold, e.g., 28 degrees Celsius. The computer 110 may identify the respective air vent to blow air to the surface portion 170 based on stored location and direction of the air vents and location of the surface portion 170 in the vehicle 100 interior 165.

Additionally or alternatively, the computer 110 may be programmed to adjust a vehicle 100 seat by actuating a seat adjustment actuator 120 to stop exposure of the surface portion 170 to the incoming radiance L. For example, the computer 110 may be programmed to move a seat backward (toward the rear of the vehicle 100 interior 165) upon detecting an incoming radiance $L_i$ to the occupant forehead exceeding a radiance threshold, e.g., 5 cd. Additionally or alternatively, the computer 110 may be programmed to actuate a vehicle 100 visor adjustment actuator 120 to move the visor to a second position to block the incoming radiance $L_i$ from illuminating the face portion 170 of an occupant 160. The computer 110 may be programmed to identify the second position of the visor based on the location of surface portion 170, and the angle of incidence $\theta_i$. The second position may be specified as a location that blocks an imaginary line from the light source 140 to a geometrical center of the surface portion 170. Additionally or alternatively, the computer 110 may be programmed to perform multiple actuation based on the determined radiance $L_i$. In one example, the computer 110 may store data, e.g., in form of a table, that specifies for each threshold, one or more actuations, e.g., upon radiance $L_i$ exceeding a threshold of 5 cd, actuating a cooling actuator 120; upon exceeding a threshold of 10 cd, actuating both cooling actuator 120 and tinting actuator 120; etc.

Figure 7A:
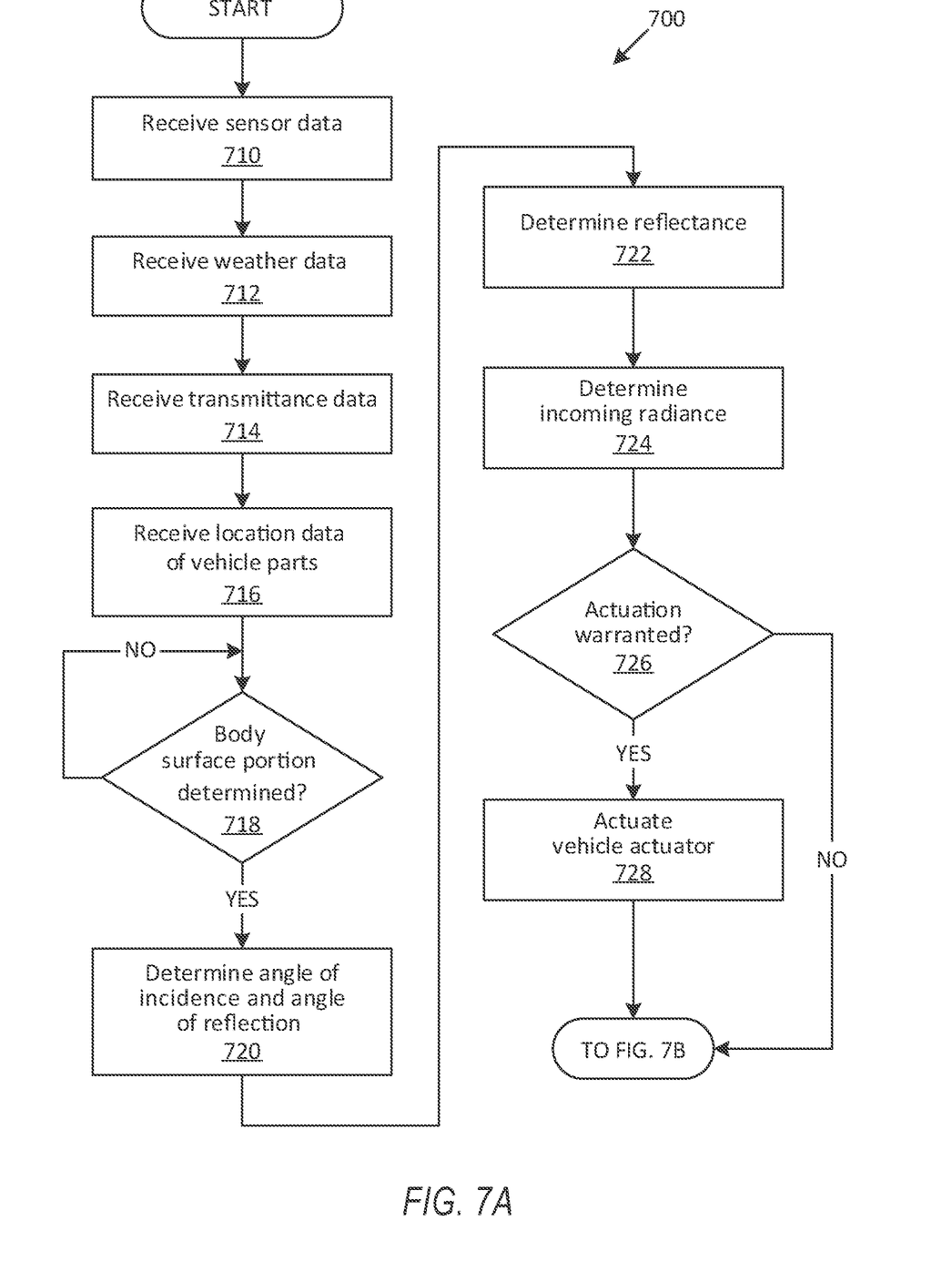
FIGS. 7A-7C are a flowchart of an exemplary process for determining a radiance to a surface.
Figure 7B:
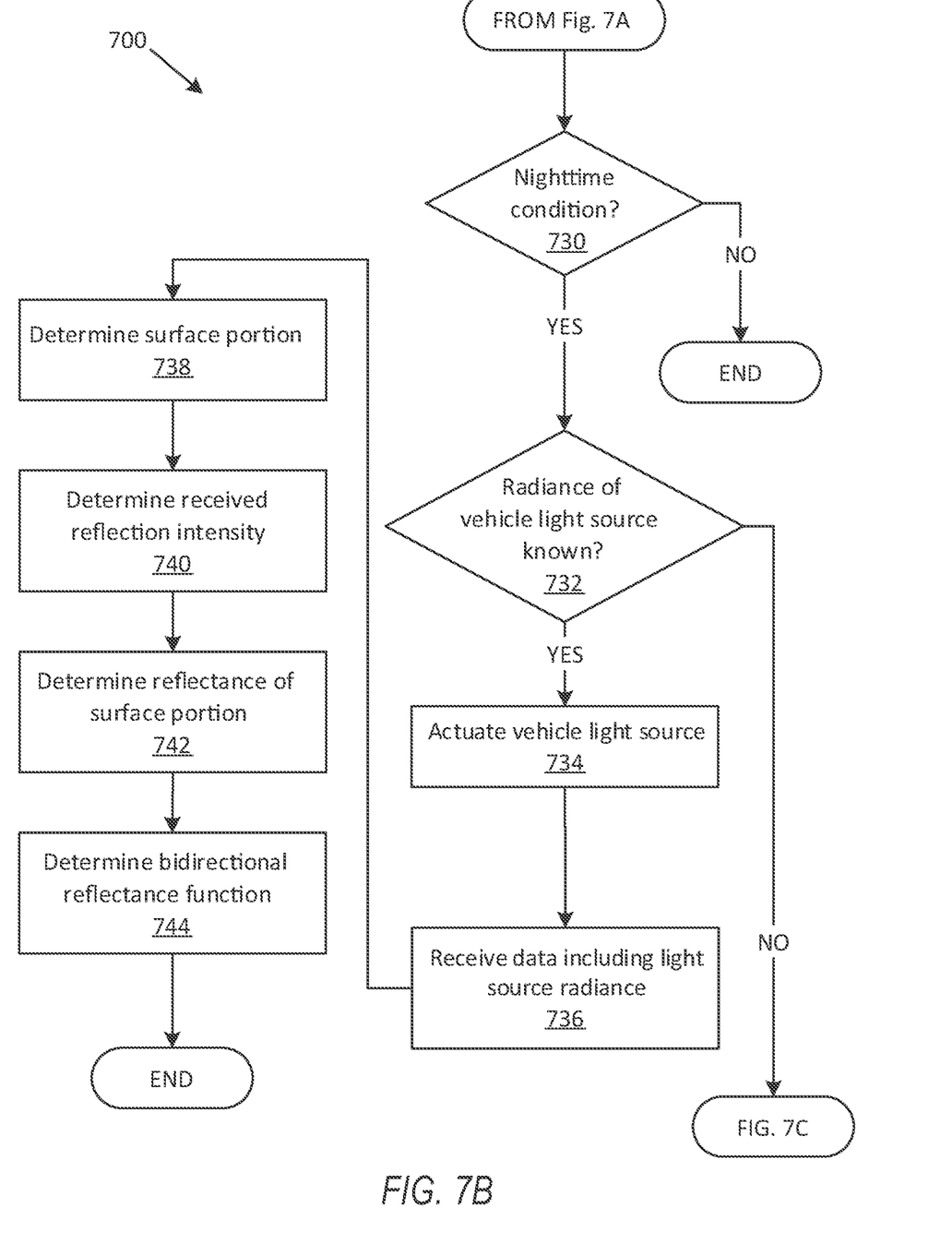
Figure 7C:
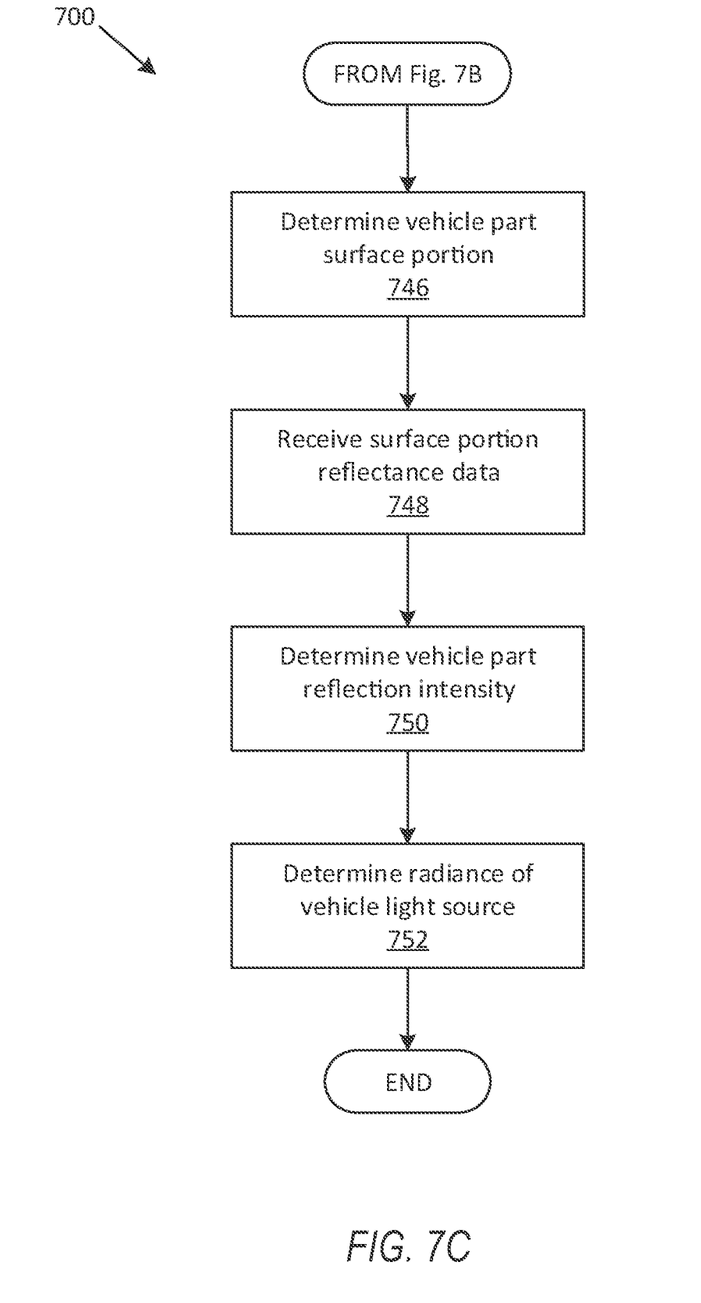

FIGS. 7A-7C are a flowchart of an exemplary process for determining a radiance to a surface. A computer such as a vehicle 100 computer 110 may be programmed to execute blocks of the process 700.

With reference to FIG. 7A, the process 700 begins in a block 710, in which the computer 110 receives sensor 130 data. The computer 110 may be programmed to receive image data from one or more camera sensors 130, e.g., a vehicle 100 sensor 130 with a field of view including at least a portion of the interior 165.

Next, in a block 712, the computer 110 receives weather data. For example, the computer 110 may receive data specifying a weather condition such as rain, snow, fog, etc. The received data may include transmittance of the respective weather condition, e.g., a transmittance of fog. Additionally or alternatively, the computer 110 may be programmed, e.g., in accordance to Table 1, to determine the transmittance based on the determined weather condition.

Next, in a block 714, the computer 110 received transmittance data of a material, e.g., a glass window 175, through which light passes to reach a body 160 surface. The computer 110 may be programmed to identify a vehicle 100 window 175 based on the window 175 location, an occupant 160 location, and a light source, e.g., sun, location, and to receive the transmittance of the respective material, e.g., glass of a window 175, from a remote computer. Additionally or alternatively, the transmittance data may be stored in a computer 110 memory.

Next, in a block 716, the computer 110 receives location data of surface portion 170 of a vehicle 100 part. Location of surface portions 170 of vehicle 100 parts, e.g., headrest, seat, etc., may be specified with respect to a 3D Cartesian coordinate system, e.g., the coordinate system 180. The computer 110 may store in a computer 110 memory the locations of the parts, e.g., seats, heating cooling vents, etc. Additionally or alternatively, the computer 110 may determine the location of a part, e.g., a vehicle 100 headrest, based on received image data using image processing techniques. For example, a surface portion 170 of a headrest may be a forward-facing portion of headrest.

Next, in a decision block 718, the computer 110 determines whether a body 160 surface portion 170, e.g., an occupant forehead, leg, hand, arm, etc., is identified. The computer 110 may be programmed to identify surface portions 170 in a received image, e.g., using image segmentation techniques. If the computer 110 determines a surface portion 170, then the process 700 proceeds to a block 720; otherwise the process 700 returns to the decision block 718, or alternatively ends, although not shown in FIG. 7A.

In the block 720, the computer 110 determines an angle of incidence $\theta_i$ and an angle of reflection $\theta_r$ for the surface portion 170, as shown in FIG. 5. The computer 110 may be programmed to determines the angles $\theta_i$, $\theta_r$ upon determining a location of the surface portion 170, a location of the light source 140, e.g., determining a location of the sun using the Sky dome technique (or any other technique to model atmospheric phenomena) specifying sun location, moon location, etc., and the location of the camera sensors 130 viewing the surface portion 170. In one example, the angles $\theta_i$, $\theta_r$ may be determined for (i) a reference point of the surface portion 170, e.g., a geometrical center point, or (ii) for multiple points on the surface portion 170 and determining average values for the angle $\theta_i$, $\theta_r$ based on the determined angles for the points on the surface portion 170.

Next, in a block 722, the computer 110 determines a reflectance $\rho$ of the surface portion 170. The computer 110 may be programmed to determine the reflectance $\rho$ of the surface portion 170 based on a bidirectional reflectance function $\rho(\theta_i, \theta_r)$ configured to output a reflectance $\rho$ of the determined surface portion 170. The bidirectional reflectance function $\rho(\theta_i, \theta_r)$ may be determined by a trained neural network, whereby the computer 110 inputs the determined angles $\theta_i$, $\theta_r$ to the trained neural network to determine the reflectance $\rho$ of the surface portion 170.

Next, in a block 724, the computer 110 determines an incoming radiance $L_i$. The computer 110 may be programmed to implement Equation (1) above to determine the incoming radiance $L_i$ based on the determined reflectance $\rho$, the angles $\theta_i$, $\theta_r$, and the determined reflection intensity $L_r$.

Next, in a decision block 726, the computer 110 determines whether an actuation of a vehicle 100 actuator 120, e.g., heating actuator 120, cooling actuator 120, seat adjustment actuator 120, tinting actuator 120, etc., is warranted, as discussed above. The computer 110 may be programmed to determine whether an actuation is warranted based on the determined incoming radiance $L_i$ and one or more thresholds. For example, the computer 110 may be programmed to determine that an actuation is warranted upon determining that the incoming radiance $L_i$ exceeds a threshold, e.g., 10 cd. If the computer 110 determines that the actuation of a vehicle 100 actuator 120 is warranted, then the process 700 proceeds to a block 728; otherwise the process 700 proceeds to a decision block 730 (FIG. 7B).

In the block 728, the computer 110 actuates a vehicle 100 actuator 120. For example, the computer 110 may actuate a heating or cooling actuator 120 to change a vehicle interior 165 temperature and/or blow air via a vent directed to the surface portion 170 to provide heating or cooling or airflow for the surface portion. The computer 110 may be programmed to select a vent for actuation based on the received data including a location and a direction of the vent and the location of the surface portion 170. Additionally or alternatively, as discussed above, the computer 110 may actuate a seat actuator 120, a visor, etc. Following the block 728, the process 700 proceeds to the decision block 730.

With reference to FIG. 7B, in the decision block 730, the computer 110 determines whether a nighttime condition is detected. The computer 110 may be programmed to detect a nighttime condition based on a time of day, data received from a vehicle 100 light sensor 130, etc. If the computer 110 determines that the nighttime condition is detected, then the process 700 proceeds to a decision block 732; otherwise the process 700 ends, or alternatively returns to the block 710, although not show in FIG. 7B.

In the decision block 732, the computer 110 determines whether an incoming radiance $L_i$ of the light source 130 for a nighttime condition is known. The computer 110 may be programmed to determine that the incoming radiance $L_i$ of a vehicle 100 near-infrared light source 140 is known based on data stored in a computer 110 memory. If the computer 110 determines that the incoming radiance $L_i$ is known, then the process 700 proceeds to a block 734; otherwise the process 700 proceeds to a block 746, as shown in FIG. 7C.

In the block 734, the computer 110 actuates a light source 140, e.g., a vehicle 100 interior 165 light. The computer 110 may be programmed to actuate a near-infrared light source 140 to turn on and illuminate an interior of the vehicle 100.

Next, in a block 736, the computer 110 receives data including light source 140 radiance $L_i$. The computer 110 may be programmed to determine light source 140 radiance $L_i$ based on data stored in a computer 110 memory.

In a block 738, the computer 110 determines a surface portion 170. For example, the computer 110 selects a body 160 forehead surface portion 170. Additionally or alternatively, the computer 110 may be programmed to determine a material surface portion 170 such as metal, leather, wood, etc.

Next in a block 740, the computer 110 determines, based on camera sensor 130 data, a reflection intensity $L_r$ received from the determined surface portion 170.

Next, in a block 742, the computer 110 determines a reflectance $\rho$ of the determined surface portion 170. The computer 110 may be programmed to determine the reflectance $\rho$ of the surface portion 170 based on the determined incoming radiance $L_i$ and the reflection intensity $L_r$.

Next, in a block 744, the computer 110 determines a bidirectional reflectance function $\rho(\theta_i, \theta_r)$ based on the determined incoming radiance $L_i$, the reflection intensity $L_r$, and the reflectance $\rho$. For example, the computer 110 may be programmed to use the determined incoming radiance $L_i$, the reflection intensity $L_r$, and the reflectance ρ as input to a neural network to output the bidirectional reflectance function ρ($θ_i$, $θ_r$). Following the block 744, the process 700 ends, or alternatively returns to the block 710, although not shown in FIGS. 7A-7B.

With reference to FIG. 7C, in the block 746, the computer 110 determines a vehicle 100 part, e.g., seat headrest, surface portion 170.

Next, in a block 748, the computer 110 receives surface portion 170 reflectance data, e.g., from a computer 110 memory or a remote computer.

Next, in a block 750, the computer 110 determines a reflection intensity $L_r$ of a surface portion 170 of a vehicle part, e.g., headrest, based on data received from a camera sensor 130.

Next, in a block 752, the computer 110 determines a radiance $L_i$ of a light source 140, e.g., a vehicle 100 light, based on the determined reflection intensity $L_r$ and the received reflectance ρ data. The computer 110 may be programmed to implement Equation (1) to determine the incoming radiance $L_i$ of the light source 140, e.g., interior 165 light source 140, based on the determined reflection intensity $L_r$ and the received reflectance ρ data. The computer 110 may be programmed to store the incoming radiance $L_i$ of the light source 140 in a computer 110 memory, thereby the computer 110 may use the stored data, e.g., in the block 736. Following the block 752, the process 700 ends, or alternatively returns to the block 710, although not shown in FIGS. 7A-7C.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, Python, Intercal, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
   determine, from an image including a portion of a surface of a human body, a reflected light intensity from the body surface portion;
   determine, a skin reflectance of the body surface portion based on a location of the body surface, a light source, and an image sensor location; and
   determine, for the body surface portion, an incoming radiance, based on the skin reflectance and the reflected light intensity.

2. The system of claim 1, wherein the instructions further include instructions to determine the skin reflectance also based on a pose of the body surface portion, the reflected light intensity, a second incoming radiance of the light source, an angle of incidence to the body surface portion, and an angle of reflection from the body surface portion.

3. The system of claim 2, wherein the light source is a vehicle light source and the instructions further include instructions to store data including the second incoming radiance of the vehicle light source.

4. The system of claim 2, wherein the instructions further include instructions to determine the second incoming radiance based on the reflected light intensity from a vehicle part and data including reflectance of the vehicle part.

5. The system of claim 1, wherein the instructions further including instructions to determine a first incoming radiance for a first light wavelength substantially filtered out by a camera sensor based on (i) the incoming radiance for a second light wavelength included in the image, and (ii) data specifying a camera sensitivity to at least the first and second light wavelengths.

6. The system of claim 1, wherein the instructions further include instructions to determine the incoming radiance of the body surface portion based on a transmittance of a window glass or a weather condition.

7. The system of claim 1, wherein the body surface portion of the human body is one of a forehead body surface portion, a face-to-cheek body surface portion, a chin body surface portion, a hand, a chest, a thigh, a knee, an arm, and a leg.

8. The system of claim 1, wherein the instructions further include instructions to input data including a vehicle location, a body surface portion location, a wavelength of the reflected light intensity, and the light source to a machine learning program and to determine a bidirectional reflectance function based on an output of the machine learning program.

9. The system of claim 8, wherein the machine learning program is a neural network trained based on a specified incoming radiance and received reflected light intensity.

10. The system of claim 8, wherein the instructions further include instructions to determine the incoming radiance based on the determined bidirectional reflectance function.

11. The system of claim 1, wherein the instructions further include instructions to determine an incoming radiance of each pixel included in the identified body surface portion, and to determine the incoming radiance of the body surface portion based on an average of the incoming radiances of the pixels.

12. The system of claim 1, wherein the instructions further include instructions to actuate, based on the determined incoming radiance, a vehicle cooling actuator, a window tinting actuator, a visor, a seat adjustment actuator, an airflow aiming actuator, or a vehicle heating actuator.

13. The system of claim 1, wherein the determined skin reflectance specifies (i) an average reflectance across a plurality of wavelength ranges, or (ii) a reflectance for a specific wavelength range.

14. A method, comprising:
   determining, from an image including a portion of a surface of a human body, a reflected light intensity from the body surface portion;
   determining, a skin reflectance of the body surface portion based on a location of the body surface, a light source, and an image sensor location; and
   determining, for the body surface portion, an incoming radiance, based on the skin reflectance and the reflected light intensity.

15. The method of claim 14, further comprising determining the skin reflectance also based on a pose of the body surface portion, the reflected light intensity, a second incoming radiance of the light source, an angle of incidence to the body surface portion, and an angle of reflection from the body surface portion.

16. The method of claim 14, further comprising determining the second incoming radiance based on the reflected light intensity from a vehicle part and data including reflectance of the vehicle part.

17. The method of claim 14, further comprising determining a first incoming radiance for a first light wavelength substantially filtered out by a camera sensor based on (i) the incoming radiance for a second light wavelength included in the image, and (ii) data specifying a camera sensitivity to at least the first and second light wavelengths.

18. The method of claim 14, further comprising determining the incoming radiance of the body surface portion based on a transmittance of a window glass or a weather condition.

19. The method of claim 14, further comprising inputting data including a vehicle location, a body surface portion location, a wavelength of the reflected light intensity, and the light source to a machine learning program and determining a bidirectional reflectance function based on an output of the machine learning program.

20. The method of claim 14, further comprising actuating, based on the determined incoming radiance, a vehicle cooling actuator, a window tinting actuator, a visor, a seat adjustment actuator, an airflow aiming actuator, or a vehicle heating actuator.

* * * * *